United States Patent
Kanj et al.

(10) Patent No.: US 11,505,112 B2
(45) Date of Patent: Nov. 22, 2022

(54) METHOD FOR CONTROLLING A LIGHT PATTERN USING A MATRIX OF LIGHT SOURCES RESPONSIVE TO STEERING ANGLE

(71) Applicant: VALEO VISION, Bobigny (FR)

(72) Inventors: Ali Kanj, Bobigny (FR); Constantin Prat, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/413,736

(22) PCT Filed: Nov. 28, 2019

(86) PCT No.: PCT/EP2019/082985
§ 371 (c)(1),
(2) Date: Jun. 14, 2021

(87) PCT Pub. No.: WO2020/126399
PCT Pub. Date: Jun. 25, 2020

(65) Prior Publication Data
US 2022/0055525 A1  Feb. 24, 2022

(30) Foreign Application Priority Data
Dec. 17, 2018 (EP) ..................... 18213166

(51) Int. Cl.
*B60Q 1/12* (2006.01)
*F21S 41/663* (2018.01)
(Continued)

(52) U.S. Cl.
CPC ................ *B60Q 1/12* (2013.01); *B60Q 1/16* (2013.01); *F21S 41/153* (2018.01);
(Continued)

(58) Field of Classification Search
CPC ................ B60Q 1/12; B60Q 2300/12; B60Q 2300/122; B60Q 2300/124;
(Continued)

(56) References Cited

U.S. PATENT DOCUMENTS

2004/0263346 A1* 12/2004 Neal ................ B60Q 1/10
362/465
2010/0264824 A1 10/2010 Goetz et al.
(Continued)

FOREIGN PATENT DOCUMENTS

DE  10 2006 039 182 A1  3/2008
DE  10 2013 108 342 A1  2/2015
(Continued)

OTHER PUBLICATIONS

International Search Report dated Mar. 23, 2020 in PCT/EP2019/082985 filed on Nov. 28, 2019.

*Primary Examiner* — Robert J May
(74) *Attorney, Agent, or Firm* — Oblon, McClelland, Maier & Neustadt, L.L.P.

(57) ABSTRACT

The invention is related to a method for controlling a light pattern provided by an automotive lighting device of an automotive vehicle, wherein a dynamic portion of the light pattern is provided at least by a matrix arrangement of light sources. This method includes the steps of sensing a turn in a steering system of the automotive vehicle, dividing the dynamic portion in a first portion and a second portion, shifting the operation of the light sources associated to the first portion in the same direction as the sensed turn and create a third portion between the shifted first portion and the second portion. The invention also provides an automotive lighting device with control means to perform the steps of the method.

20 Claims, 4 Drawing Sheets

(51) Int. Cl.
 *F21S 41/153* (2018.01)
 *B60Q 1/16* (2006.01)
 *F21W 102/155* (2018.01)

(52) U.S. Cl.
 CPC ........ *F21S 41/663* (2018.01); *B60Q 2300/05* (2013.01); *B60Q 2300/122* (2013.01); *F21W 2102/155* (2018.01)

(58) Field of Classification Search
 CPC ......... B60Q 2300/126; B60Q 2300/128; F21S 41/663; F21S 41/153; F21Y 2105/10; F21Y 2115/10
 See application file for complete search history.

(56) References Cited

U.S. PATENT DOCUMENTS

| | | |
|---|---|---|
| 2015/0009693 A1 | 1/2015 | Sekiguchi et al. |
| 2018/0010755 A1 | 1/2018 | Park et al. |
| 2019/0031086 A1 | 1/2019 | Gutjahr et al. |

FOREIGN PATENT DOCUMENTS

| | | |
|---|---|---|
| DE | 10 2016 200 339 A1 | 7/2017 |
| EP | 2 821 282 A2 | 1/2015 |
| JP | 2013-54849 A | 3/2013 |

\* cited by examiner

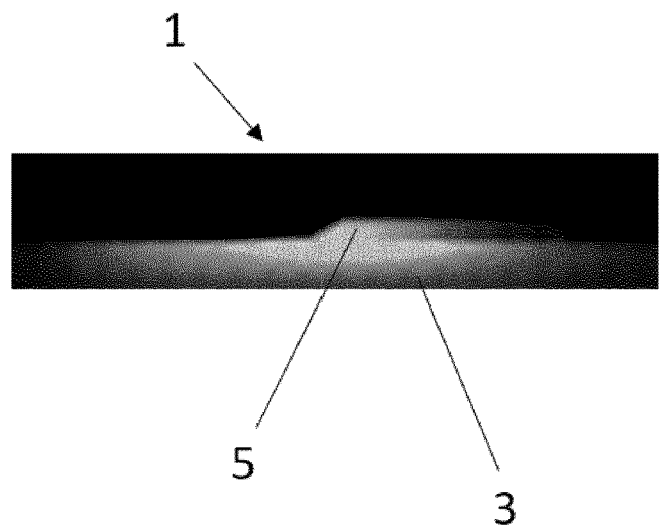
Fig. 3
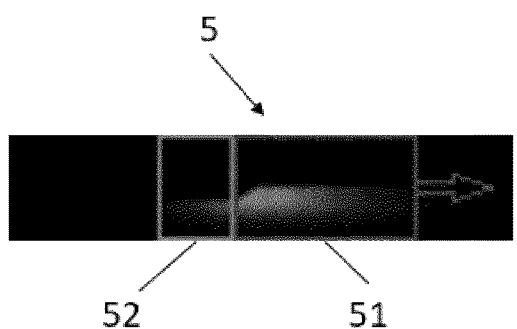 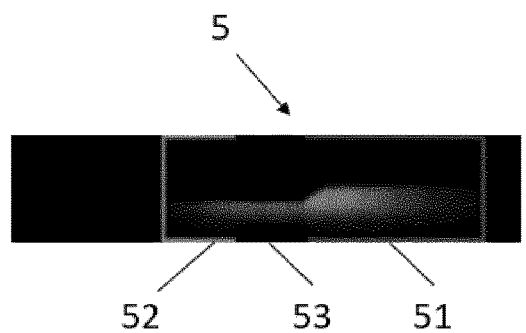
Fig. 4a              Fig. 4b
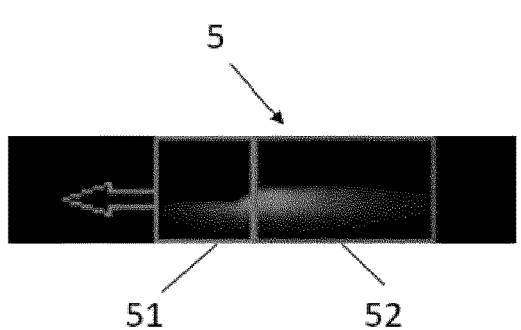 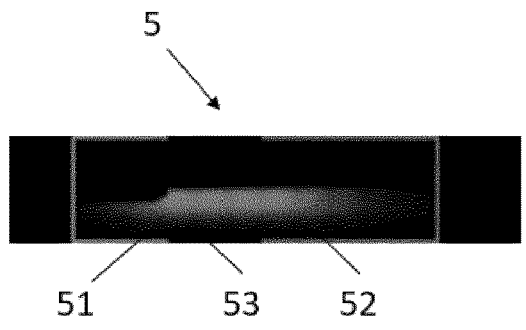
Fig. 5a              Fig. 5b

| 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 6 | 8 | 9 | 9 | 8 | 6 | 4 | 0 |
| 0 | 0 | 0 | 0 | 0 | 0 | 0 | 0 | 0 | 0 | 0 | 5 | 6 | 9 | 10 | 10 | 9 | 9 | 8 | 0 |
| 0 | 0 | 0 | 0 | 0 | 0 | 0 | 0 | 0 | 0 | 4 | 8 | 10 | 10 | 10 | 10 | 10 | 10 | 10 | 8 |
| 0 | 0 | 0 | 0 | 0 | 0 | 0 | 0 | 0 | 4 | 8 | 10 | 10 | 10 | 10 | 10 | 10 | 10 | 10 | 8 |
| 0 | 0 | 0 | 0 | 1 | 2 | 3 | 3 | 4 | 8 | 10 | 10 | 10 | 10 | 10 | 10 | 10 | 10 | 8 | 6 |
| 4 | 5 | 5 | 6 | 6 | 7 | 7 | 8 | 8 | 10 | 10 | 10 | 10 | 10 | 10 | 10 | 10 | 7 | 5 | 0 |
| 6 | 8 | 8 | 8 | 8 | 9 | 9 | 10 | 10 | 10 | 10 | 10 | 10 | 10 | 10 | 10 | 5 | 3 | 0 | 0 |

METHOD FOR CONTROLLING A LIGHT PATTERN USING A MATRIX OF LIGHT SOURCES RESPONSIVE TO STEERING ANGLE

TECHNICAL FIELD

This invention is related to the field of automotive lighting devices, and more particularly, to the way light patterns are managed when using a Dynamic Bending Light (DBL) functionality.

STATE OF THE ART

Dynamic Bending Lights are increasingly present in current automotive lighting devices, becoming an upgrade to standard headlights and designed to make driving at night easier and safer.

To implement such a lighting functionality, there have been many solutions intended to provide a light pattern in the direction of the movement of the vehicle when it is entering a curve.

Mechanic-based solutions turn the lighting source as the steering wheel does, by means of an angular movement converter which directly uses the turning of the steering wheel to induce a turning in the lighting source. The lights will turn in whatever direction the wheel does, and this range of motion allows the lights to illuminate the road even when taking sharp turns or turning quickly.

This solution has received a huge number of improvements, so that the turning of the light source is more effective and also takes into account different driving circumstances.

An alternative solution for this problem is sought.

SUMMARY OF THE INVENTION

The invention provides an alternative solution for providing a dynamic bending light by a method for controlling a light pattern according to claim 1 and an automotive lighting device according to claim 8. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for controlling a light pattern provided by an automotive lighting device of an automotive vehicle, wherein a dynamic portion of the light pattern is provided by a matrix arrangement of light sources, the method comprising the steps of
  sensing a turn in a steering system of the automotive vehicle;
  divide the dynamic portion in a first portion and a second portion
  shifting the operation of the light sources associated to the first portion in the same direction as the sensed turn; and
  create a third portion between the shifted first portion and the second portion.

This method provides a controlled light pattern which includes a Dynamic Bending Light functionality, provided by the same lighting device that provides, for example, the low beam functionality, without moving parts and also being able to adapt to other driving circumstances, such as the driving speed or the presence of cars in the opposite direction.

The shifting in the operation should be understood as displacing one or more columns to the right or to the left, depending on the movement of the steering system, the light pattern provided in the matrix: if the original pattern in one row is, e.g., 0-0-1-1-0, where 0 is a light turned off and 1 is a light turned on, after a 1 column shift to the left, the resulting pattern would be 0-1-1-0-0, and after a 1 column shift to the right, the resulting pattern would be 0-0-0-1-1. The subsequent creation of a third portion should be understood as the activation of the light sources which are associated to the blank spaces created when shifting the first portion. In another example, if the original pattern is 0-0-1-1-1-0-0-0-0-0, and the second portion is defined as 0-0-1 and the first portion is defined as 1-1-0-0-0-0-0, and the turning of the vehicle involves shifting 2 columns to the right, the second portion would remain the same 0-0-1, but the second portion would shift 2 columns to the right, creating 2 columns of blank space: 0-0-1-1-0-0-0. The creation of a third portion between the first portion and the second portion would "fill this blank space", so that the final light pattern, after joining the first portion, the second portion and the third portion would be 0-0-1-1-1-1-1-0-0-0. The first "1" would belong to the second portion, the next two "1"s would belong to the third portion and the remaining two "1"s would belong to the first portion, which has been shifted to the right.

In some particular embodiments of this method, the light pattern further comprises a fixed beam provided by a first group of solid-state light sources, and the matrix arrangement comprises a second group of solid-state light sources, wherein the sum of the fixed beam and the dynamic portion gives result in the light pattern.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

The combination of a fixed beam and a matrix beam arrangement is a very common solution for current headlamps. The matrix arrangement is in charge of providing some lighting functionalities and, with the method of the invention, this matrix beam is also configured to provide a Dynamic Bending Light functionality without adding any additional element.

In some particular embodiments of this method, the third portion is an interpolation between the first portion and the second portion The third portion fills the gap created when the first portion is shifted according to the turning of the vehicle. In these embodiments, the way of defining the luminous intensity of each pixel would be an interpolation between the column of the shifted first portion which is closest to the third portion and the column of the second portion which is closest to the third portion. In some particular embodiments, this interpolation is linear.

In some particular embodiments, the light pattern is a low beam pattern and the first portion comprises the cut-off of the low beam pattern.

The cut-off is a diagonal line of the low beam pattern, and its shape is important in automotive regulations. The fact that this cut-off belongs to the first portion means that this cut-off is being shifted when the vehicle turns. This is advantageous since the shifted pattern must also comply with the regulations. However, the invention may be also applied to other lighting functionalities without a cut-off, such as the high beam.

In some particular embodiments of this method, before the step of shifting the operation of the light sources, the angular displacement of the steering system is sensed and converted into a number of positions to shift, and then the step of shifting is carried out using this number of positions to shift.

The matrix of solid-state light sources may have many different angular resolutions. Depending on the number and arrangement of these light sources, resolution may vary from 0.01° per light source up to 0.5° per light source. Hence, the angular position of the steering wheel may be translated in a different number of columns of the light array, depending on the density of these light sources in the array arrangement.

In some particular embodiments, this method further comprises the step of internally checking the luminous intensity in one point of the light pattern.

Due to the changes which are caused in the total light pattern due to the shifting of a portion of it, it is sometimes necessary to check if some of the light points which are regulated by the official law still accomplishes its luminous intensity standards.

In a second inventive aspect, the invention provides an automotive lighting device comprising
- a first group of solid-state light sources, intended to provide a fixed beam
- a matrix arrangement of solid-state light sources, intended to provide a dynamic beam
- control means for accomplishing the steps of the method according to the first inventive aspect.

This automotive lighting device is configured to provide a Dynamic Bending Light functionality without moving parts, and using elements which are already available, but with a new configuration.

In some particular embodiments, the matrix arrangement comprises at least 2000 solid-state light sources.

This invention can be useful for many types of lighting matrix/array-based technology, from the simplest one, with only a few thousands light sources, to more advanced ones, with several hundred thousand light sources.

BRIEF LIST OF DRAWINGS AND REFERENCE NUMBERS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 3 shows a light pattern projected by the lighting device of FIG. 2.

FIGS. 4a and 4b show some steps of the method according to the invention when the steering system turns to the right.

FIGS. 5a and 5b show some steps of the method according to the invention when the steering system turns to the left.

FIGS. 6a to 6c show a detailed view of the operation of this matrix arrangement, before the steering system is being operated and thereafter.

Figure 1:
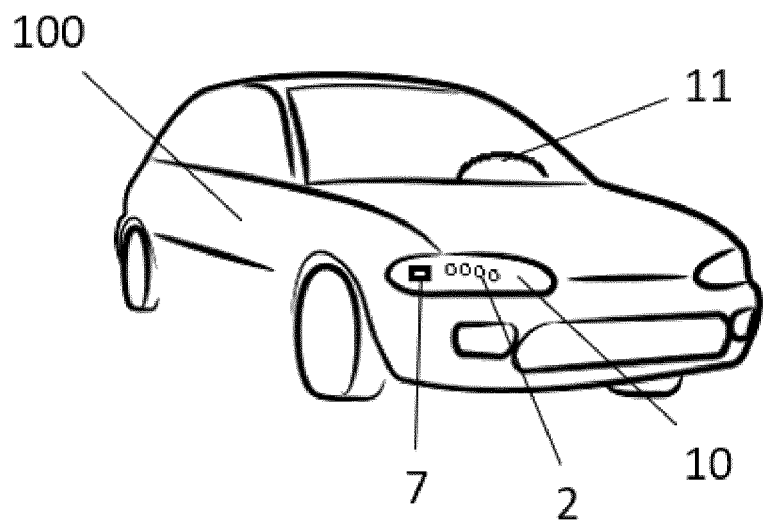
FIG. 1 shows a general perspective view of an automotive vehicle comprising an automotive lighting device according to the invention.

Elements of the example embodiments are consistently denoted by the same reference numerals throughout the drawings and detailed description where appropriate:
1 Light pattern
2 LED
3 Fixed beam
4 First lighting module
5 Remainder of a low beam pattern
51 First portion of the remainder
52 Second portion of the remainder
53 Third portion of the remainder
6 Matrix arrangement
7 Control centre
10 Lighting device
11 Steering system
100 Automotive vehicle

DETAILED DESCRIPTION OF THE INVENTION

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a general perspective view of an automotive vehicle 100 comprising an automotive lighting device 10 according to the invention.

This automotive vehicle 100 comprises a steering system 11 and a lighting device 10. The lighting device 10 comprises a plurality of groups of LEDs 2 and a control centre 7 which is configured to control the operation of these groups of LEDs.

The control centre 7 is configured to modify the configuration of the LEDs 2 when the steering wheel of the vehicle is activated.

Figure 2:
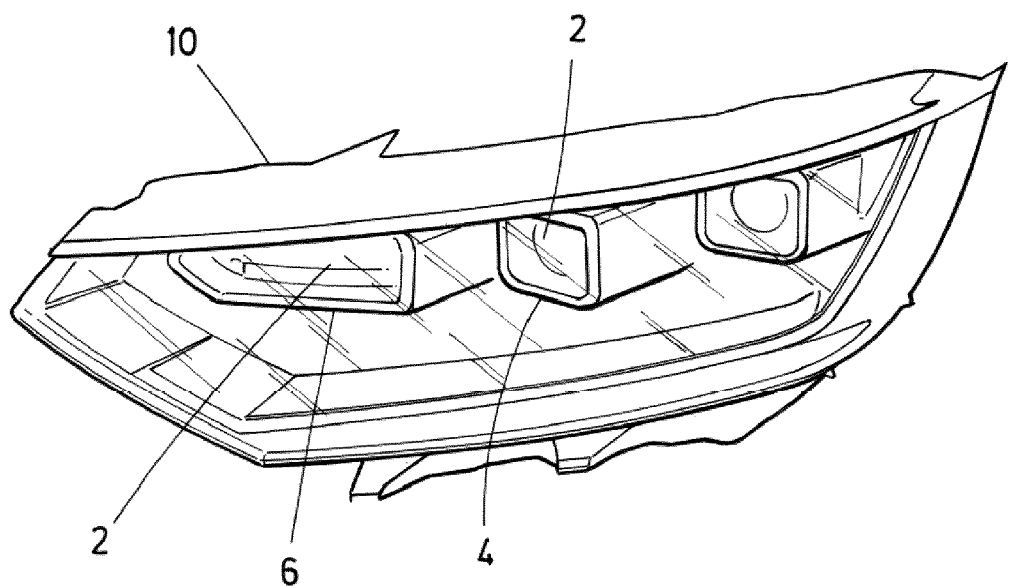
FIG. 2 shows a closer view of a particular embodiment of a lighting device according to the invention.

FIG. 2 shows a closer view of a particular embodiment of a lighting device 10 according to the invention.

This lighting device 10 comprises a first group of LEDs 2 which are grouped in a first lighting module 4 and a second group of LEDs 2 which are arranged in a matrix configuration 6.

This matrix configuration 6 is a high-resolution module, having a resolution greater than 1000 pixels. However, no restriction is attached to the technology used for producing the projection modules.

A first example of this matrix configuration comprises a monolithic source. This monolithic source comprises a matrix of monolithic electroluminescent elements arranged in several columns by several rows. In a monolithic matrix, the electroluminescent elements can be grown from a common substrate and are electrically connected to be selectively activatable either individually or by a subset of electroluminescent elements. The substrate may be predominantly made of a semiconductor material. The substrate may comprise one or more other materials, for example non-semiconductors (metals and insulators). Thus, each electroluminescent element/group can form a light pixel and can therefore emit light when its/their material is supplied with electricity. The configuration of such a monolithic matrix allows the arrangement of selectively activatable pixels very close to each other, compared to conventional light-emitting diodes intended to be soldered to printed circuit boards. The monolithic matrix may comprise electroluminescent elements whose main dimension of height, measured perpendicularly to the common substrate, is substantially equal to one micrometre.

The monolithic matrix is coupled to the control centre so as to control the generation and/or the projection of a pixilated light beam by the matrix arrangement 6. The control centre is thus able to individually control the light emission of each pixel of the matrix arrangement.

Alternatively to what has been presented above, the matrix arrangement 6 may comprise a main light source coupled to a matrix of mirrors. Thus, the pixelated light source is formed by the assembly of at least one main light source formed of at least one light emitting diode emitting light and an array of optoelectronic elements, for example a matrix of micro-mirrors, also known by the acronym DMD, for "Digital Micro-mirror Device", which directs the light rays from the main light source by reflection to a projection optical element. Where appropriate, an auxiliary optical element can collect the rays of at least one light source to focus and direct them to the surface of the micro-mirror array.

Each micro-mirror can pivot between two fixed positions, a first position in which the light rays are reflected towards the projection optical element, and a second position in which the light rays are reflected in a different direction from the projection optical element. The two fixed positions are oriented in the same manner for all the micro-mirrors and form, with respect to a reference plane supporting the matrix of micro-mirrors, a characteristic angle of the matrix of micro-mirrors defined in its specifications. Such an angle is generally less than 20° and may be usually about 12°. Thus, each micro-mirror reflecting a part of the light beams which are incident on the matrix of micro-mirrors forms an elementary emitter of the pixelated light source. The actuation and control of the change of position of the mirrors for selectively activating this elementary emitter to emit or not an elementary light beam is controlled by the control centre.

In different embodiments, the matrix arrangement may comprise a scanning laser system wherein a laser light source emits a laser beam towards a scanning element which is configured to explore the surface of a wavelength converter with the laser beam. An image of this surface is captured by the projection optical element.

The exploration of the scanning element may be performed at a speed sufficiently high so that the human eye does not perceive any displacement in the projected image.

The synchronized control of the ignition of the laser source and the scanning movement of the beam makes it possible to generate a matrix of elementary emitters that can be activated selectively at the surface of the wavelength converter element. The scanning means may be a mobile micro-mirror for scanning the surface of the wavelength converter element by reflection of the laser beam. The micro-mirrors mentioned as scanning means are for example MEMS type, for "Micro-Electro-Mechanical Systems". However, the invention is not limited to such a scanning means and can use other kinds of scanning means, such as a series of mirrors arranged on a rotating element, the rotation of the element causing a scanning of the transmission surface by the laser beam.

In another variant, the light source may be complex and include both at least one segment of light elements, such as light emitting diodes, and a surface portion of a monolithic light source.

FIG. 3 shows a light pattern 1 projected by this lighting device. The first light module projects a fixed beam 3 and the matrix arrangement, in this case, is configured to project the remainder 5 of a low beam pattern.

In this case, this remainder 5 comprises the cut-off of the light pattern. In other lighting applications, such as a high beam, there is no cut-off, and the matrix arrangement projects a different light scheme.

FIG. 4a shows a division in this remainder 5 of the low beam pattern, projected by the matrix arrangement.

This remainder 5 has been divided into a first portion 51 and a second portion 52. The first portion 51 will be shifted with the turning of the steering system of the vehicle, while the second portion 52 will remain still.

FIG. 4b shows the shifting of the first portion 51 to the right. The first portion comprises the cut-off and is shifted to the right according to the movement of the steering system of the vehicle. A third portion 53 is created between the first portion and the second portion, to fill the gap between them. The structure of this third portion is a linear interpolation between the last column of the first portion and the last column of the second portion, which are the columns which surround the gap which is filled by the third portion.

FIGS. 5a and 5b show a similar example, but to the left. In this case, the first portion is on the left, and the cut-off is shifted with the first portion, but the second portion corresponds to a different profile than the second portion in the case of a right turn. The third portion, in any case, is a linear interpolation between the first and the second portions.

Figures 6A, 6B:
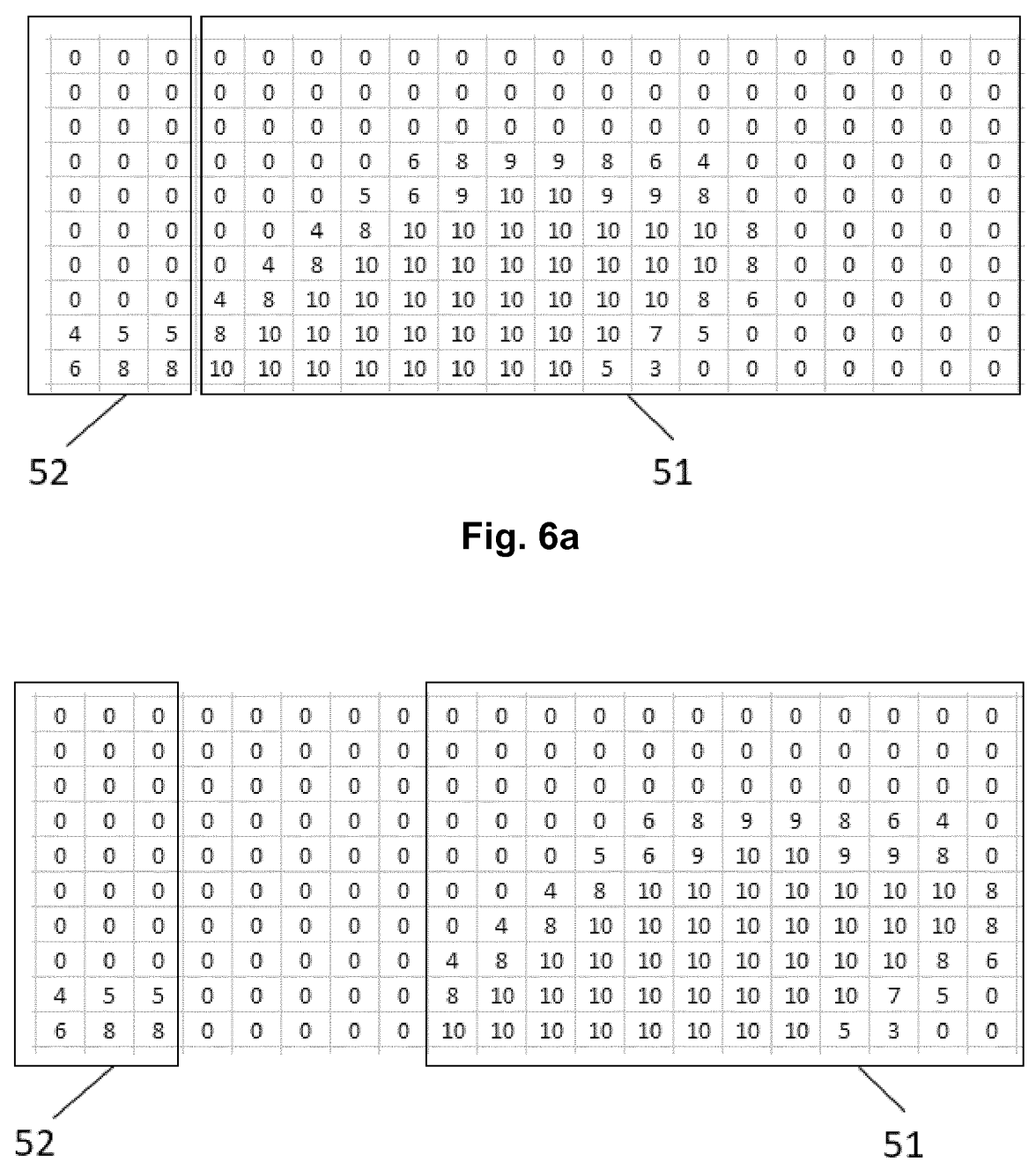

FIG. 6a shows a detailed view of the operation of this matrix arrangement. In this figure, 20 columns and 10 rows of the matrix arrangement are seen. In each cell, one number from 1 to 10 represents the luminous intensity of the associated LED, in intervals of 10%. Thus, a number "4" represents 40% of luminous intensity, and a number 5 represents 50% of luminous intensity.

When the steering system turns, for example, 1° to the right, a method according to the invention converts this angular displacement into a number of rows, according to the resolution of the matrix arrangement. For example, in cases where the resolution is 0.2° per LED column, an angular displacement of 1° would be converted into 5 LED columns.

After calculating the number of LED columns, the control centre divides the dynamic portion in a first portion and a second portion and shifts the operation of the light sources of the matrix arrangement which are associated to the first portion 5 columns to the right, resulting an operation as the one shown in FIG. 6b. In this FIG. 6b, a blank space is shown between the shifted first portion 51 and the second portion 52, which remains still.

FIG. 6c shows the final pattern, with a third portion 53 between the first portion 51 and the second portion 52. In this FIG. 6c, the operation of the LEDs of the same 20 columns have changed, thus providing a Dynamic Bending Light functionality 1° to the right side of the automotive vehicle. Since a matrix arrangement may include several hundred thousand of LEDs and the resolution is usually comprised between 0.01° per LED column and 0.5° per LED column, this shifting usually involves many columns of LEDs.

After this shifting has been carried out, it is usually recommended to check if the lighting points which are defined in official regulations are providing a suitable value of luminous intensity. For example, the luminous intensity in point 50L may be checked to verify it this accomplishes luminous standards.

In some cases, it is possible that the luminous intensity of the light emitted by some of the LEDs may be corrected. The control centre may apply in these cases a correction of the value of the luminous intensity, depending on the luminous intensity of the fixed beam.

The invention claimed is:

1. Method for controlling a vehicle light pattern provided by an automotive lighting device of an automotive vehicle, wherein a dynamic portion of the vehicle light pattern is provided by a matrix arrangement of light sources, the method comprising the steps of:
   sensing a turn a steering system of the automotive vehicle;
   dividing the dynamic portion into a first portion light pattern and a second portion light pattern which is adjacent to the first portion;
   shifting an operation of the light sources associated with the first portion in a same direction as the sensed turn such that the first portion is laterally spaced from the second portion; and
   creating a third portion light pattern in a space between the shifted first portion and the second portion.

2. Method according to claim 1, wherein the vehicle light pattern further comprises a fixed beam provided by a first group of solid-state light sources, and the matrix arrangement comprises a second group of solid-state light sources, wherein the sum of the fixed beam and the dynamic portion provides the vehicle light pattern.

3. Method according to claim 2, wherein the third portion is an interpolation between the first portion and the second portion.

4. Method according to claim 2, wherein the vehicle light pattern is a low beam pattern and the first portion comprises the cut-off of the low beam pattern.

5. Method according to claim 2, wherein before the step of shifting the operation of the light sources, an angular displacement of the steering system is sensed and converted into a number of positions to shift, and then the step of shifting is carried out using the number of positions to shift.

6. Method according to claim 2, further comprising the step of internally checking a luminous intensity in one point of the light pattern.

7. Method according to claim 1, wherein the third portion is an interpolation between the first portion and the second portion.

8. Method according to claim 7, wherein the interpolation is linear.

9. Method according to claim 8, wherein the vehicle light pattern is a low beam pattern and the first portion comprises the cut-off of the low beam pattern.

10. Method according to claim 8, wherein before the step of shifting the operation of the light sources, an angular displacement of the steering system is sensed and converted into a number of positions to shift, and then the step of shifting is carried out using the number of positions to shift.

11. Method according to claim 8, further comprising the step of internally checking a luminous intensity in one point of the light pattern.

12. Method according to claim 7, wherein the vehicle light pattern is a low beam pattern and the first portion comprises the cut-off of the low beam pattern.

13. Method according to claim 7, wherein before the step of shifting the operation of the light sources, an angular displacement of the steering system is sensed and converted into a number of positions to shift, and then the step of shifting is carried out using the number of positions to shift.

14. Method according to claim 7, further comprising the step of internally checking a luminous intensity in one point of the light pattern.

15. Method according to claim 1, wherein the vehicle light pattern is a low beam pattern and the first portion comprises the cut-off of the low beam pattern.

16. Method according to claim 15, wherein before the step of shifting the operation of the light sources, an angular displacement of the steering system is sensed and converted into a number of positions to shift, and then the step of shifting is carried out using the number of positions to shift.

17. Method according to claim 1, wherein before the step of shifting the operation of the light sources, an angular displacement of the steering system is sensed and converted into a number of positions to shift, and then the step of shifting is carried out using the number of positions to shift.

18. Method according to claim 1, further comprising the step of internally checking a luminous intensity in one point of the light pattern.

19. Automotive lighting device comprising:
   a first group of solid-state light sources, intended to provide a fixed beam;
   the matrix arrangement of solid-state light sources, intended to provide a dynamic beam;
   control means for accomplishing the steps of the method according to claim 1.

20. Automotive lighting device according to claim 19, wherein the matrix arrangement comprises at least 2000 solid-state light sources.

* * * * *